United States Patent [19]

Dona et al.

[11] Patent Number: 4,481,552
[45] Date of Patent: Nov. 6, 1984

[54] DISC UNIT FOR INFORMATION RECORDING AND/OR READING SYSTEM

[75] Inventors: Marinus J. J. Dona; Adrianus J. J. Franken, both of Eindhoven; Pieter van der Giessen, The Hague, all of Netherlands

[73] Assignee: U.S. Philips Corporation, New York, N.Y.

[21] Appl. No.: 315,792

[22] Filed: Oct. 28, 1981

Related U.S. Application Data

[63] Continuation-in-part of Ser. No. 146,902, May 5, 1980, abandoned.

[30] Foreign Application Priority Data

Jan. 22, 1980 [NL] Netherlands .......................... 8000381

[51] Int. Cl.³ ...................... G11B 23/02; G11B 17/00
[52] U.S. Cl. ........................................ 360/97; 360/133
[58] Field of Search .................... 360/98, 97, 133, 132

[56] References Cited

U.S. PATENT DOCUMENTS 3,487,390 12/1969 Klinger ................................ 360/98
4,151,572 4/1979 Yamamoto ........................... 360/98
4,358,803 11/1982 Giessen ................................ 360/99

FOREIGN PATENT DOCUMENTS 1416254 12/1975 United Kingdom ................ 360/133

OTHER PUBLICATIONS

Disk Pack Cover, by Bell, IBM Tech. Disc. Bul., vol. 22, No. 5, Oct. 1979, p. 1792.

Primary Examiner—Alan Faber
Attorney, Agent, or Firm—Robert J. Kraus

[57] ABSTRACT

A system for recording/reading information, comprising interchangeable disc units and a drive unit. Each disc unit comprises a disc pack with at least one information disc which is contained in an enclosure comprising two covers which can move relative to each other and which are interconnected by connecting means. The drive unit comprises means for supporting and driving the information-disc pack and means for recording/reading the information on the information discs, means for releasing the connection between the covers, and means for moving the covers relative to each other.

11 Claims, 21 Drawing Figures

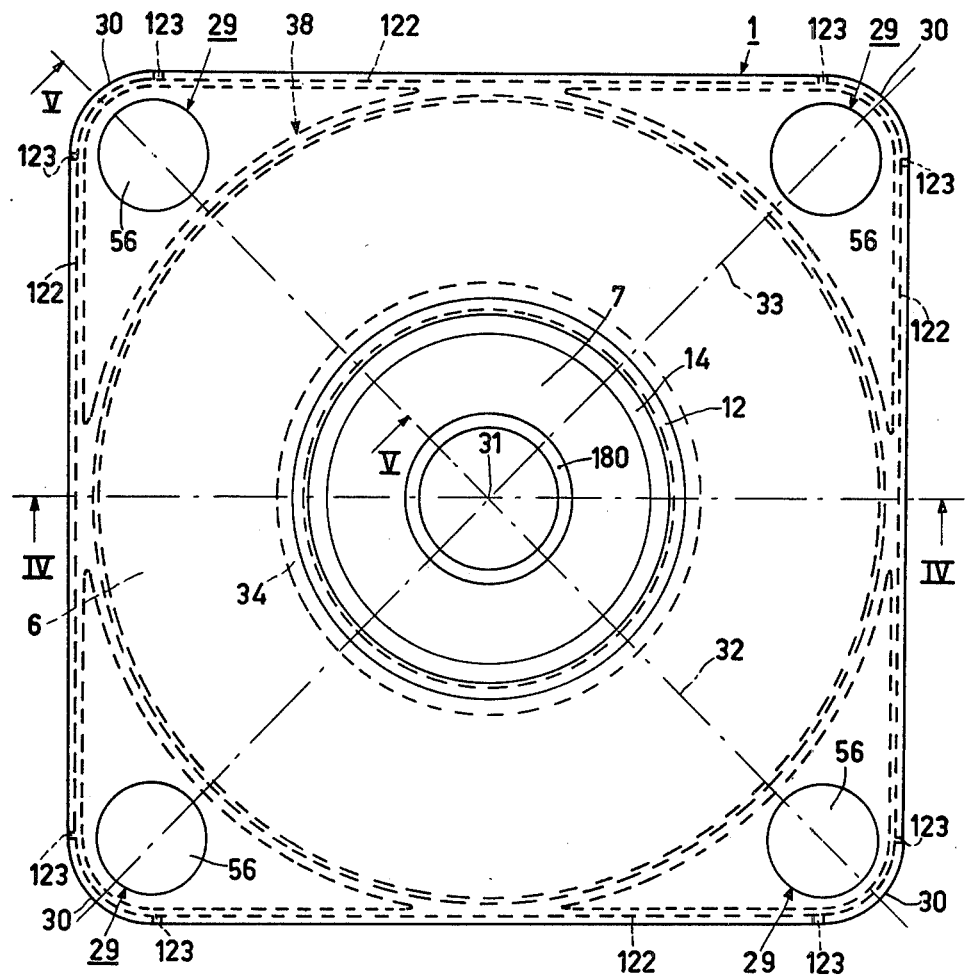
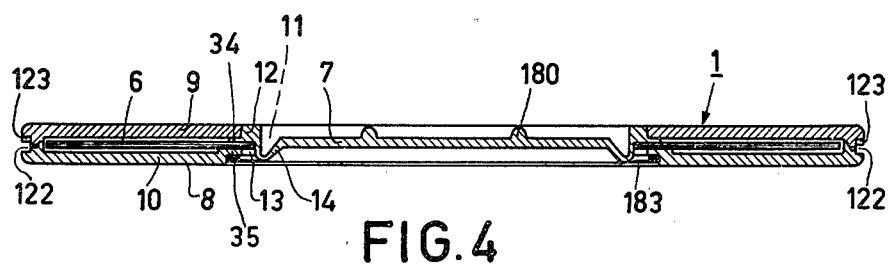
FIG. 3
FIG. 4

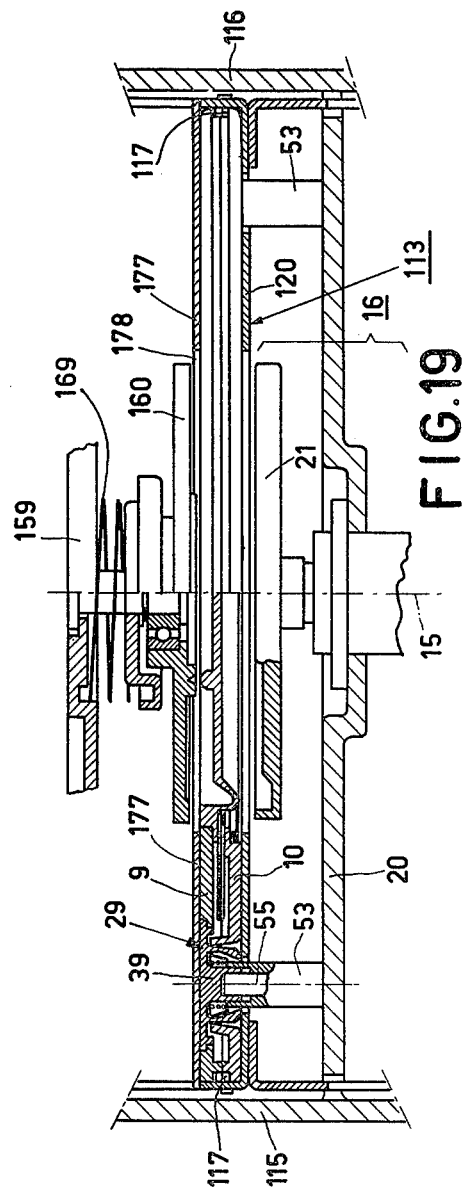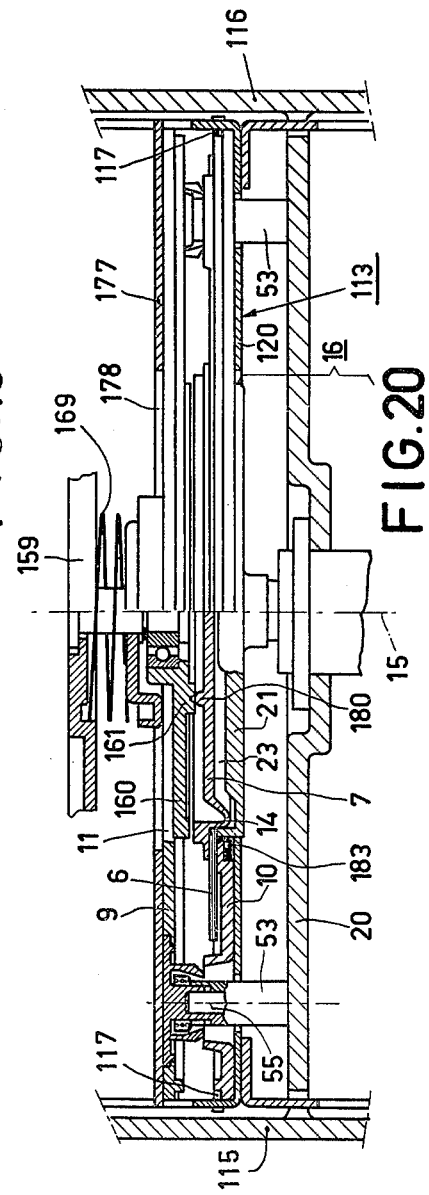

DISC UNIT FOR INFORMATION RECORDING AND/OR READING SYSTEM

This application is a continuation-in-part of co-pending application Ser. No. 146,902, filed May 5, 1980, now abandoned.

BACKGROUND OF THE INVENTION

The invention relates to an information recording and/or reading system comprising an interchangeable disc unit for holding recorded information and a drive unit for manipulating the disc unit. The interchangeable disc unit comprises a disc pack including at least one information disc, a polygonal enclosure including first and second covers for containing the disc pack, and connecting means for interconnecting the two covers. The two covers engage with each other and are movable relative to each other from a closed position to an operating position. At least one of the covers has a central opening for the passage of means for rotary drive of the disc pack when the covers have been moved from the closed position to the operating position. The connecting means comprise connecting devices attached to the covers near corners thereof.

The drive unit comprises a drive device, an information recording and/or reading apparatus and a cover displacement device. The drive device, which is rotatable about an axis of rotation for the rotary drive of the disc pack, comprises a drive spindle provided with means for centering and supporting the disc pack on the drive spindle. The information recording and/or reading apparatus, which is utilized for recording information on and/or reading information from a disc pack placed on the drive device, comprises a recording and/or reading head which is radially movable relative to the axis of rotation of the drive device. The cover displacement device is utilized for moving the two covers of a disc unit placed on the drive unit relative to each other between the closed position and the operating position.

Such a system is disclosed in German patent specification No. 1,524,974 to which U.S. Pat. No. 3,487,390 corresponds. In this system the disc pack comprises three magnetic information discs contained in an enclosure of cylindrical shape. The enclosure comprises an upper cover with a central recess in which a handle is located, and has a cylindrical side wall and a flat lower cover, which is connected to a hub. The three information discs are mounted on the hub. The hub extends into the interior of the disc unit over the full height of the enclosure. The handle in the center of the upper cover comprises connecting means adapted to connect the upper cover to the hub of the disc pack and thus to the lower cover.

The drive unit comprises a hinged cover at its top which is swung open when a disc unit is to be placed thereon. By means of the handle in the upper cover a disc unit is manually placed onto the drive device of the drive unit. The lower cover of the disc unit leaves the center portion of the hub free, so that the hub can be lowered freely onto the drive spindle, where it is centered by the centering means and supported by the supporting means. A push rod is axially movable into the center of the drive spindle. The handle in the upper cover is designed so that the connecting means can be actuated through the hub of the disc pack by means of the push rod. When the hinged cover of the drive unit is closed the push rod is axially moved in the drive spindle, by means of a system of cables, pulleys and levers, in order to release the upper cover. Subsequently the upper cover is axially moved relative to the lower cover and thus relative to the disc pack into its operating position. The push rod returns to its original position and the disc pack together with the lower cover is rotated by the drive unit.

An information recording and/or reading apparatus comprises a plurality of arms which are radially movable relative to the axis of rotation of the drive device. The arms can be moved toward the disc pack so that magnetic heads, which are mounted on the ends of the arms, can cooperate with the information discs. If the disc unit is to be removed from the drive unit, the operations described in the foregoing are performed in a reverse order by opening the cover. By means of the system of cables, pulleys and levers the upper cover is lowered onto the disc pack and subsequently the upper cover is reconnected to the hub and thus to the lower cover. The disc pack can be manually removed from the drive unit by means of the handle.

The disc units for this information recording and/or reading system thus have comparatively intricate connecting means and the drive units have the drawback that a push rod which is axially movable through the spindle must be provided in order to release the connecting means from the disc unit.

A further disadvantage with the disc unit is that the lower cover rotates along with the information disc during operation. As a result of this, the disc pack is not suitable for cooperation with an optical information recording and/or reading apparatus which is adapted to cooperate with an information disc at the underside and which is radially movable relative to the drive spindle on the deck of a drive unit.

U.S. Pat. No. 4,151,572 describes another disc unit of the type defined in the opening paragraph, which unit is of a substantially square shape in a view at the covers. The connecting means comprise either identical levers with associated compression springs. Near each of its four corners each cover is provided with a bearing pin for a lever, which pin extends perpendicularly to the cover, so that said lever is pivotable to a limited extent in a direction parallel to the covers. The levers are arranged symmetrically relative to the center of the enclosure and identically for both covers. The bearing pins are located at a small offset from the diagonals of the cover. The levers each comprise a free end with an oblique face. On fitting the covers on each other, the oblique surfaces at the free ends of the levers on the first cover cooperate with those of the levers on the second cover, so that the levers, against spring pressure, are pivoted out and are subsequently pivoted back. In the pivoted-back positions the levers on the one cover hook behind the levers on the other cover at their free ends, so that the covers are interconnected. For releasing the covers they are formed with openings near the corners, enabling release pins of a drive unit to be introduced in an axial direction. The release pins slightly pivot the four levers on the cover through which the release pins extend against spring pressure, so that the free ends of the levers no longer cooperate with each other. After this the covers can be moved relative to each other to the operating position.

The connecting means of this disc unit comprise a comparatively great number of separate parts, namely eight levers and eight compression springs as well as eight retainers for the levers on the bearing pins The bearing pins should be strong and the levers should be journalled on said pins with a comparatively small clearance. The disc unit can be opened in a comparatively easy manner by unauthorized persons. For this purpose it suffices to pivot a lever at every corner through a small angle via the opening in the cover. A small axial displacement of the covers relative to each other is then sufficient to separate the covers from each other. In many cases this will be possible because of the elasticity of and the clearance between the covers.

A further disadvantage with the known disc unit is that the lower cover rotates along with the information disc during operation. As a result of this, the disc pack is not suitable for cooperation with an optical information recording and/or reading apparatus which is adapted to cooperate with an information disc at the underside and which is radially movable relative to the axis of rotation of the disc pack.

SUMMARY OF THE INVENTION

It is an object of the invention to provide an information recording and/or reading system comprising a compact drive unit and a disc unit adapted for use therein.

It is another object of the invention to provide a disc unit suitable for use with both electrical and optical infomation recording and/or reading apparatus.

It is yet another object of the invention to provide an interchangeable disc unit, of the type mentioned in the opening paragraph, whose connecting devices comprise fewer parts than known disc units, and which cannot readily be opened by unauthorized persons.

It is still another object of the invention to protect the disc pack against dust. In conjunction with this object the invention is characterized in that the two covers are provided with dust-sealing means which in the closed position cooperate with each other and constitute a dust-sealing device which is disposed concentrically around the disc pack and near its circumference.

The connecting devices make it possible to separate the two covers completely from each other in the operating position. In principle, however, it is also possible to employ these devices in disc units in which the covers need not be separated completely from each other, but merely have to be moved apart over some distance. This may, for example, be the case when an optical information disc is used, which cooperates with an optical recording and/or read unit arranged on the deck of the drive unit underneath the information disc. For such an application the side wall of the enclosure need not be open during operation for the passage of a recording and/or reading device. Rather, for example, the cover facing the deck of the drive unit may be formed with a radial slot through which a radiation beam can be focused on the information disc.

An embodiment of the invention which does employ a separable connection between the covers is characterized in that a connecting device is used of which the first connecting means comprises at least one connecting element which is connected to the first cover, which element is pivotable between a connecting position and a released position and has a free end which is remote from the first cover. The second connecting means on the second cover comprises a stop which in the closed position of the enclosure cooperates with the pivotable connecting element near its free end in its connecting position and thus prevents the two covers from being moved relative to each other, but which leaves the pivotable connecting element free when said element is in the released position. This embodiment is especially suitable for systems in which the disc unit should always face the drive device of the drive unit with its second cover. The system may further be characterized in that the release device of the drive unit comprises a release element which is movable relative to the disc unit, for pivoting the pivotable connecting element away from the outside of the enclosure from its connecting position to its released position, the second cover of the enclosure having at least one opening for the passage of the release element and/or the pivotable connecting element.

A further embodiment is characterized in that each connecting device comprises a plurality of pivotable connecting elements which are uniformly arranged around a central axis, which elements are constituted by fingers which extend away from the first cover; that the second cover is provided with an annular stop for the fingers, which stop is coaxial with said central axis and has a central opening which is defined by an inner wall with a diameter which decreases in the direction of the first cover; and that in the connecting position the fingers; at least near their free ends, engage with the inner wall under the influence of a resilient load which is directed away from the central axis.

It is of importance that the connecting devices which are used are such that the disc unit, when it is situated outside the drive unit, cannot readily be opened by unauthorized persons. An embodiment which is of significance in this respect is characterized in that between the fingers there is disposed a latching member which is axially movable between a latched position and an unlatched position, which member in the latched position cooperates with the fingers in order to latch said fingers in their connecting positions and which in the unlatched position allows the fingers to pivot to their released positions; and that the release element of the drive unit comprises an unlatching member for axially moving the latching member from its latched position to its unlatched position. There may then be provided resilient means for loading the latching member towards its latched position and also resiliently loading the fingers towards the connecting positions. Thus a connecting device is obtained which cannot readily be opened by unauthorized persons and which is moreover suitable to be opened, once it is in the drive unit, during a translation of the disc unit in the dirction of the drive spindle. It suffices to move the latching member against the spring force with the aid of the release element in order to cause the fingers to pivot under the influence of their own elasticity, so that subsequently to two covers can freely be moved apart to the operating position. The resilient means may comprise a helically wound compression spring which cooperates with a cup-shaped latching member, whose bottom has a smaller diameter than an upper rim, the compression spring pressing on the bottom of the cup-shaped latching member. In order to prevent an undesired transverse movement of the cup-shaped latching member and, moreover, in order to further complicate opening of the connecting device by unauthorized persons, an embodiment is of interest which is characterized in that the bottom of the cup-shaped member has a central opening and that the connecting device is provided with a guide member for the latching member, which guide member is connected to the first cover and extends through the central opening of the latching member with a free end. For moving the latching member, a substantially uniform pressure is necessary on the bottom of the cup-shaped latching member, around the guide member. Thus, an annular tool is required, because local pressure on the annular portion of the bottom of the latching member will result in an oblique position of the latching member, so that this can no longer be moved to the unlatched position. The presence of the guide member may furthermore lead to another embodiment, which is characterized in that the guide member has an axial bore which terminates in the free end and that the release device of the drive unit is provided with a locating pin which fits in the axial bore, for locating the disc unit on the drive unit.

In disc units employing connecting devices with pivotable connecting elements, as described in the foregoing, an embodiment of the invention may be used which is characterized in that each of the first connecting means comprises a component made of an elastic plastic and secured to the first cover, which component is integral with the pivotable connecting element(s), and that each stop on the second cover is integral with the second cover. In this way an inexpensive and efficient-to-manufacture connecting device is obtained, of which the movable connecting element can be manufactured from a material with suitable resilient properties, which is capable of repeatedly being subjected to varying bending stresses. The enclosure itself can be made of a different plastic. An entirely different type of a connecting device is used in an embodiment of the invention which is characterized in that each connecting device comprises at least one permanent magnet and that the first and the second connecting means magnetically cooperate with each other. Yet another type of connecting device is characterized in that a bayonet connecting device is used, comprising a rotatable connecting member, which is mounted for rotation in the second cover, as well as stationary connecting means on the first cover, which means cooperate with the rotatable connecting member, the release device of the drive unit being provided with a rotatably drivable connecting-member rotator which cooperates with the rotatable connecting member by stop means.

It is alternatively possible to employ connecting devices which do not allow the complete separation of the connecting device, so that the two covers can only be moved to a limited extent relative to each other. Such an embodiment may then be characterized in that the connecting devices comprise elastically deformed portions for elastically urging the two covers toward each other. In this embodiment the two covers remain resiliently loaded toward each other under all conditions. As the case may be, stops may be used which prevent overloading of the resilient means by limiting the travel of the two covers relative to each other. This type of connecting device is especially useful when the disc pack comprises only one information disc and the disc unit may thus have a very flat shape. This embodiment is characterized in that the first and the second connecting means comprise a first and a second substantially disc-shaped spring element having a center and formed with a plurality of slots in arc-of-circle segments which are concentric with the center. The first and the second disc-shaped spring elements are ridigly connected to each other near their centers and are rigidly connected to the first and the second cover, respectively, near their circumference. Such spring elements have a small height relative to the maximum possible spring deflection.

Both in systems in which disc units are employed whose covers can be separated completely by detaching the connections, and in systems employing disc units where this is not possible, an embodiment of the invention is of advantage, which is characterized in that the cover displacement means of the drive unit comprises a supporting frame which is movable between a rest position and an operating position. In the rest position the frame supports a disc unit in the closed position thereof at some distance from the drive device; that the cover displacement means comprise a moving mechanism connected to the supporting frame, for moving the supporting frame between the rest position and the operating position in a direction which is at least substantially parallel to the axis of rotation of the drive device; that the first stops are stationary and prevent the cover which is remote from the drive device from being moved, as the supporting frame moves to the operating position, when the operating position of said cover is reached; and that the second stops are connected to the supporting frame and said stops move the other cover along into its operating position, when the supporting frame moves to the operating position. Because of such a cover displacement device, the drive unit is of relatively simple construction.

An embodiment may be used in which the release device performs a second function. This embodiment is characterized in that the first stops belong to the release device for releasing the connecting devices of a disc unit which has been placed in position; and that the release device, relative to a disc unit which is supported by the supporting frame in its rest position, is located nearer the drive device, so that by moving the supporting frame from its rest position to its operating position the connecting devices are moved toward the release devices and are made to cooperate therewith, the release device supporting the first cover in its operating position after the connecting devices have been released by the release device and the further movement of the supporting frame.

Especially when magnetic disc units are employed, provided with only one information disc of small diameter, the invention may provide a system which may be regarded as a high-quality alternative to the well-known "floppy-disc" systems. These known systems comprise disc-units, the so-called "Diskettes", having a small magnetic storage disc of a foil materia, which is accommodated in a special envelope. Through a slot in front of the housing the "Diskette" can be inserted into a drive unit and is subsequently centered and clamped in position on the turntable of the drive unit by closing the slot by means of a flap. However, owing to the comparatively simple technology which has been selected, such systems have a limited data-storage capacity, which is not adequate for all applications. Moreover, the magnetic discs are subjected to wear owing to the friction produced between the disc and the envelope so that data may be lost.

In the case of a system in accordance with the invention it is also possible to adopt such a design that a disc unit can be inserted into a drive unit. Such a system may for example be characterized in that the enclosure of the disc unit is formed with a slot in each of the side walls; that the supporting frame of the drive unit comprises guide portions for guiding a disc unit in the rest position, during a sliding insertion or removal over the support frame, said portions comprising lateral guide portions for guiding the side walls of the disc unit; and that the second stops are connected to the lateral guide portions and project into the slot of an inserted disc unit. For those applications in which the disc unit should always face the drive device with one of its sides, an embodiment may be used which prevents the incorrect insertion of a disc unit and which is characterized in that the first cover of the disc unit is provided with at least one projection which projects into the slot and that one of the second stops on the supporting frame cooperates with the said projection and thereby prevents the sliding insertion of a disc unit if said unit faces the drive device with the first cover.

An embodiment of the invention which enables a small and compact drive unit to be obtained, which may be suitable to cooperate with magnetic disc units provided with a single information disc of a diameter of approximately 20 cm, and which was found to perform well in practice, is characterized in that the drive unit comprises a substantially box-shaped housing with mutually parallel upper and lower walls, mutually parallel left-hand and right-hand side walls, a rear wall and a front wall with an opening; that the front wall at least partly consists of a flap which is pivotable about a pivoting axis transverse to the side walls of the housing, namely between a closed position, in which the housing is substantially closed and the flap covers the opening in the front wall, and an open position in which a disc unit can be placed onto the supporting frame through the opening in the front wall; that the moving mechanism comprises left-hand and right-hand sliding members which are slidable along the left-hand and the right-hand side wall of the housing respectively between a front most position which is situated nearer the front of the housing and a rearmost position which is situated nearer the back of the housing; that the sliding members are movably coupled to the said flap; that the moving mechanism furthermore comprises a translation device, which is coupled to the supporting frame and which comprises left-hand and right-hand translation members which are translatable, at least substantially parallel to the axis of rotation of the drive device, between an upper position situated nearer the upper wall of the housing and a lower position situated nearer the lower wall of the housing; and that the translation members are movably coupled to the sliding members, the flap, the sliding members and the translation members cooperating in such a way that the movement of the flap from its open position to its closed position results in the movement of the sliding plates from the frontmost position to the rearmost position, the movement of the translation member from the upper position to the lower position and thus the movement of the supporting frame from the rest position to the operating position.

If the drive unit comprises a drive device more or less similar to those known frm the previously mentioned drive devices for "floppy discs", an embodiment which is of significance for a satisfactory dust-tight sealing of the disc unit is characterized in that the disc-pack of the disc unit is provided with a rim which projects in the direction of the adjacent cover of the enclosure and which has a cylindrical outer wall; that the drive device for the rotary drive of the disc pack comprises a turntable with an annular supporting surface for supporting the disc pack adjacent said projecting rim; and that the central opening in the enclosure of the disc unit has a diameter which is sufficiently great for the passage of the annular supporting face of the turntable and is locally sealed by an annular elastic member which at its outer circumference is rigidly connected to the relevant cover and which furthermore in a dust-tight manner engages with but is detached from the cylindrical outer wall of the said projecting rim of the disc pack.

BRIEF DESCRIPTION OF THE DRAWINGS

The invention will now be described in more detail with reference to the drawing, in which:

FIG. 3 is a plan view of the disc unit of FIG. 2;

FIG. 4 is a cross-sectional view of the disc unit of FIG. 3 taken along the line IV—IV;

FIG. 19 shows a part of the cross-sectional view of FIG. 18, but with the connecting devices of the disc unit released and with the upper cover of the enclosure resting on four release elements;

FIG. 20 shows the cross-sectional view of FIG. 19, but with the information disc centered on a turntable of the drive device.

DESCRIPTION OF THE PREFERRED EMBODIMENTS

Figure 1:
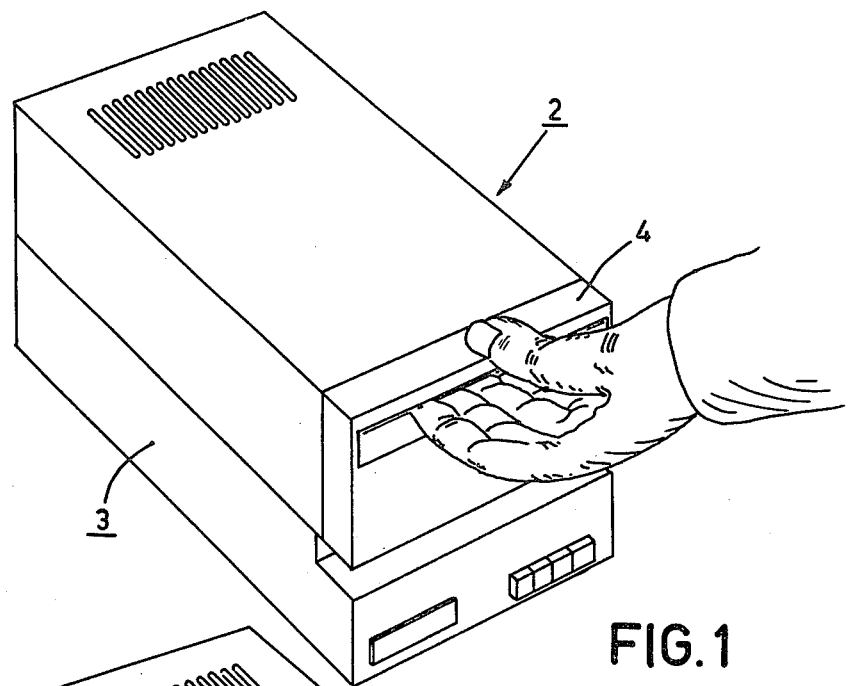
FIG. 1 is a perspective view of a drive unit placed on an associated cabinet accommodating the necessary electronics.
Figure 2:
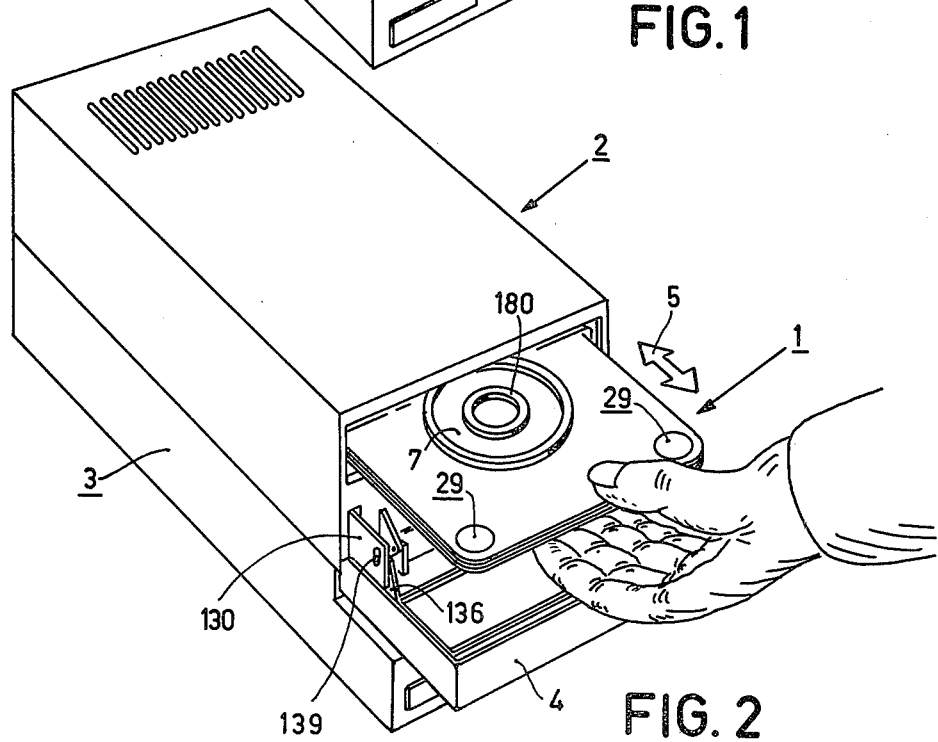
FIG. 2 shows the drive unit of FIG. 1, but now with an opened flap at the front and with a disc unit partly inserted into the drive unit.
Figure 5:
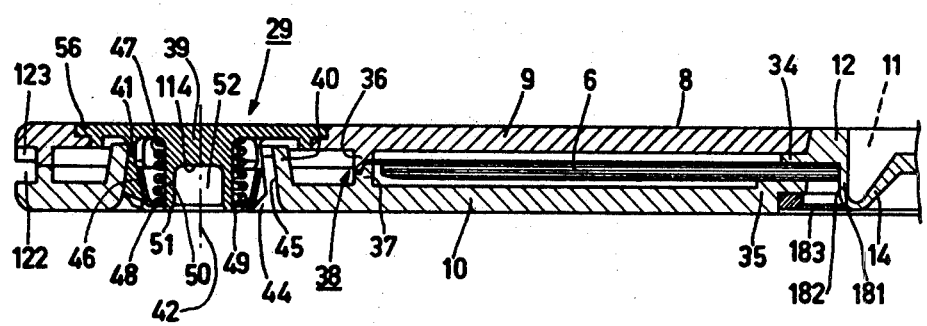
FIG. 5 on a slightly enlarged scale, is a cross-sectional view of the disc unit of FIG. 3 taken along the line V—V.
Figure 6:
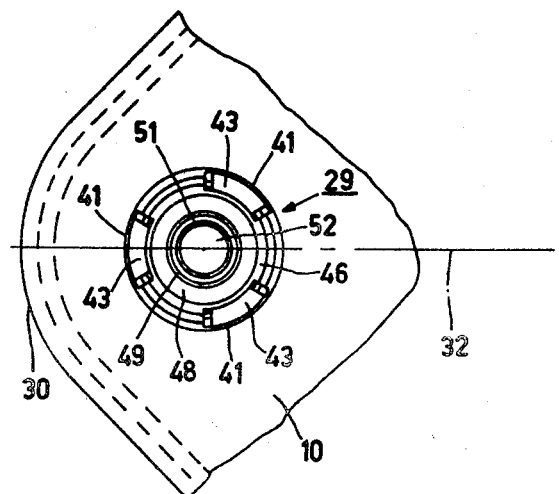
FIG. 6 illustrates a connecting device for the disc unit of FIG. 3.

The system shown in FIGS. 1 and 2 comprises an interchangeable disc unit 1 and an associated drive unit 2, with the aid of which data can be recorded or reproduced magnetically. The drive unit 2 measures approximately 40×24×13 cm and cooperates with disc units 1 measuring approximately 22×22×1 cm. The drive unit 2 is placed on a cabinet 3, which has been adapted to the dimensions of the drive unit and which accommodates the electronics required for controlling the flow of data to and from the disc unit. The combination comprising the drive unit 2 and the cabinet 3 may be utilized as peripheral equipment in conjunction with computers and with similar equipment such as text processors. At the front the drive unit 2 comprises a flap 4 which is pivotable about a lower edge. The flap is formed with a slot in order to enable the flap to be opended into the position shown in FIG. 2 with the fingers of one hand. When the flap is open the disc unit 1 can be manually slid into and out of the drive unit in the directions of the double-headed arrow 5. On closing the flap the disc unit 1 is opened and the information disc accommodated therein is placed onto a drive device of the drive unit 2. This will be described in more detail hereinafter. FIGS. 4 through 6 as well as FIGS. 14 through 21 all relate to the system shown in FIGS. 1 and 2. In these drawing figures, corresponding parts are designated by the same reference numerals. The remaining figures relate to parts of alternative systems, in which different reference numerals are used.

Referring to FIG. 4, the interchangeable disc unit 1 comprises a single magentic information disc 6, which consists of an aluminum substrate having a diameter of approximately 210 mm, which on both sides is provided with a magnetizable layer. The magnetic information disc is smaller than the customary rigid aluminum storage discs employed in peripheral equipment for computers and the like, but has the same properties. In the center of the information disc an elastic plastics centering element 7 is mounted, which serves for centering the information disc on the drive device. This centering element in itself constitutes the subject of applicant's Netherlands patent application 7908859 (PHN 9648) corresponding to U.S. Pat. No. 4,358,803 (herewith incorporated by reference).

The information disc 6 is accommodated in an enclosure 8, which comprises a first cover 9 and a second cover 10. Said covers engage with each other and are movable relative to each other from a closed position. The two covers together constitute a substantially closed enclosure in which the disc pack is retained. The first cover 9 is formed with a central opening 11, which engages with an annular portion 12 of the centering element 7. The second cover 10 has a central opening 13 of greater diameter, through which a convolution 14 of the centering element 7 projects. The opening 13 serves for the passage of a turntable for the rotary drive of the information disc 6 when the covers 9 and 10 have been moved from the closed position to the operating position, as is to be described in more detail hereinafter. In the closed position, see FIGS. 4 and 5, the two covers 9 and 10 are interconnected with the aid of first connecting means, attached to the first cover 9, and second connecting means, attached to the second cover 10. These means will also be described in more detail hereinafter.

The drive unit 2, also see FIGS. 14 through 21, comrises a drive device 16, which is rotatable about an axis of rotation 15, for the rotary drive of the information dics 6. The drive device comprises a drive spindle 17, which is constituted by the motor shaft of a drive motor 18, which is mounted on a deck plate 20 of the drive unit by means of a flange 19. Near a free end a disc 21 is rigidly mounted on the drive spindle 17, which disc constitutes a turntable for the information disc 6. On its upperside the disc 21 has a supporting surface 22 which functions as supporting means for the information disc. This surface is formed with a recess 23, which is defined by an inner wall 24. This inner wall functions as centering means for centering the information disc. For recording and/or reading information on the information disc 6 there are provided two magnetic heads 25 and 26, which are mounted on the ends of two arms 27 and 28 respectively. Said arms are radially movable relative to the axis of rotation 15 of the drive device.

The enclosure of the disc unit, in a view on the covers (see FIG. 3), has a substantially polygonal, viz. substantially square, shape. The connecting means for interconnecting the covers 9 and 10 comprise four separate connecting devices 29, which are each located between a respective corner 30 and the circumference of the information disc 6. The four connecting devices 29 are identical and are disposed at equal distances from the center 31 of the information disc 6, on the diagonals 32 and 33 of the square.

The information disc 6 is clamped in position by the covers 9 and 10. The first cover 9 presses on a flange-shaped portion 34 of the centering element 7, while the second cover 10 is locally provided with an annular raised portion 35, which rests directly on the substrate of the information disc 6, namely on a portion which does not serve for information storage. When the connecting devices 29 have been released, the covers have a slightly curved shape which is not shown in the drawing. The covers are made of a slightly resilient plastics and in the released situation they face each other with their convex sides. The connecting devices 29 draw the covers toward each other near the corners 30, the covers being resiliently bent from the slightly curved condition into a flat condition. The information disc 6 is then resiliently clamped between the two covers. In the closed position the information disc is locked against movement because the annular portion 12 of the centering element 7 engages with the central opening 11 of the first cover. Apart from the locations where the information disc 6 is clamped between the covers 9 and 10, the disc is entirely clear of the two covers, so that the part which is available for recording and/or reproducing the information will always be entirely free from any contact with the covers, and no damage can be caused by the contact therewith.

In order to prevent the penetration of dust into the enclosure, the two covers are provided with dust sealing means which cooperate with each other and which constitute a dust sealing device 38 (see FIG. 5) which is disposed concentrically around the information disc 6 near its circumference. The dust sealing means comprise annular raised portions 36 and 37 of the two covers 9 and 10, which raised portions substantially engage with each other when the covers are in the closed position. It is alternatively possible to employ an elastically deformable material, such as a foam-plastic ring. The connecting devices 29 are each located between a corner 30 or the enclosure and the dust sealing device 38, so that any dust which enters the connecting devices 29 cannot automatically reach the information disc 6.

Near the central opening 11 penetration of dust could also be possible. At the side of the cover 9 this is prevented because the cover rests on the flange 34 and only a slight clearance exists between the cover and the annular portion 12 of the centering element 7. The centering element has a rim 181 which extends in the direction of the cover 10 and which has a cylindrical outer wall 182, both belonging to the convolution 14. In the annular raised portion 35 an annular elastic member 183 has been glued, which locally seals the central opening 11 and which adjoins, but is detached therefrom, the cylindrical outer wall 182 in a dust-tight manner. Said member does not impair the cooperation of the information disc 6 with the drive device 16 because the central opening 11 is so large that the turntable can pass through the opening. The member 183 is then elastically deformed, but does not prevent the passage of the turntable.

Each of the releasable connecting devices 29 (see FIGS. 5 & 6) comprises first connecting means 39 on the first cover 9 as well as second connecting means 42 on the second cover 10. The second means cooperate with said first means and are movable relative thereto. All four connecting devices can be released with the aid of a release device on the drive unit, to be discussed hereinafter.

The disc unit 1 shown is, as stated previously, provided with four identical connecting devices 29. In principle, it would also be possible to employ connecting devices of different types at the various corners. It is also possible to use two different types of connecting devices, a first type on the diagonal 32 and a second type on the diagonal 33. However, in the present system such a shape of the disc unit is required that it can be inserted into the drive unit 2 without regard to the side wall that is in front. In the connecting devices 29, each of the first connecting means 39 comprises three connecting elements which are connected to the first cover 9 so as to be pivotable between a connecting position and a released position. These elements comprise fingers 41 which extend away from the first cover 9 and which are uniformly arranged around a central axis 42. Each of the fingers 41 has a free end 43 which is remote from the cover 9. Each second connecting means on the second cover 10 comprises a stop 40 which, in the closed position of the enclosure, cooperates with the three fingers 41 near the free ends 43 and in this position prevents the covers 9 and 10 from being moved relative to each other.

Figure 21:
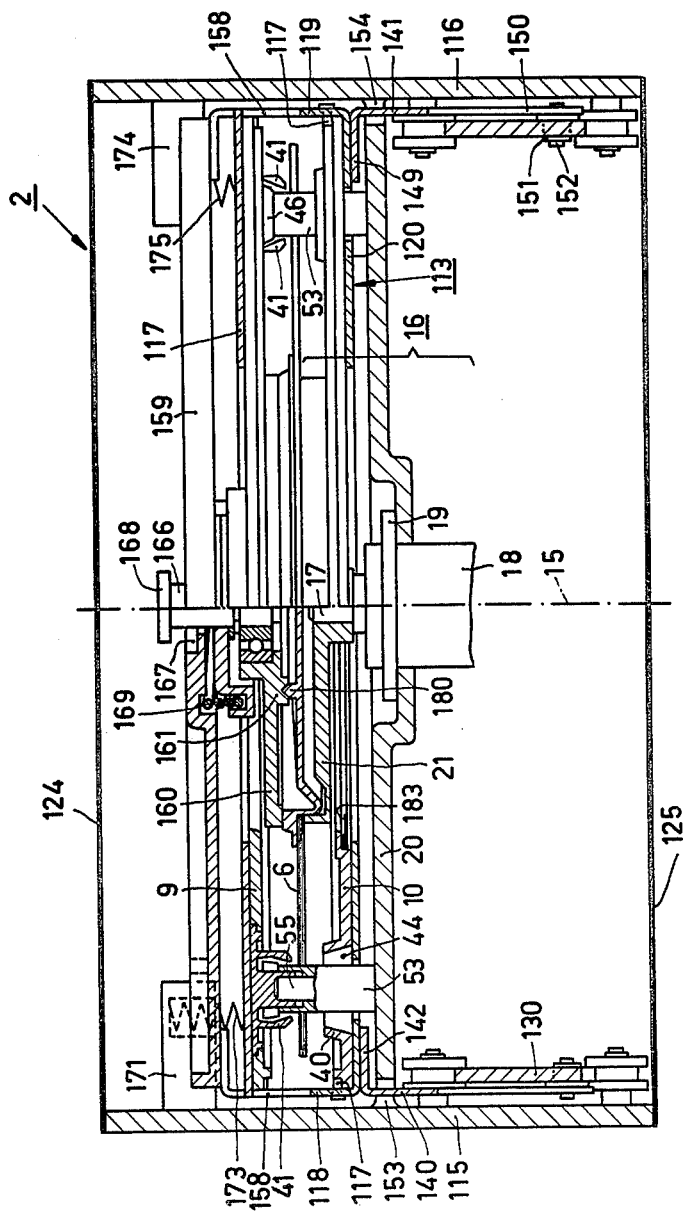
FIG. 21 shows the cross-sectional view of FIG. 18, the covers of the disc unit being in the operating position relative to each other and the information disc being centered and clamped in position on the turntable of the drive device.

In FIG. 5 the fingers 41 are in a connecting position. (FIG. 21 shows the fingers 41 in a released position in which they have been pivoted to a position nearer the axis 42.) The stop 40 on the cover 10 for the fingers 41 is annular and consists of a ring which is integral with the cover 10 and which is concentric with the axis 42. The annular stop 40 has a central opening 44 which is defined by an inner wall 45 having a diamter which decreases in the direction of the first cover 9. In the connecting position shown in FIG. 5 the fingers 41 are urged against the inner wall 45 of the annular stop 40 near their free ends 43 under the influence of a resilient load which is directed away from the central axis 42.

Between the three fingers there is disposed a latching member 46 which is axially movable in the direction of the central axis between a latched position (shown in FIG. 5) and unlatched position (shown in FIGS. 19 thru 21). In the latched position said latching member cooperates with the fingers 41 and latches said fingers in their connecting positions. In the unlatched position it leaves the fingers free to pivot in a direction toward the central axis 42, toward a released position. The latching member 46 is resiliently loaded toward its latched position by means of a helical compression spring 47. Said member urges the fingers 41 toward their connecting positions by pressing them against the inner wall 45 of the annular stop 40. The latching member 46 is made of a thin metal, for example brass or aluminium, and takes the form of a cup with a bottom 48 having a smaller diamater than the upper rim. The compression spring 47 presses on the bottom 48 of the latching member 46. In the bottom 48 a central opening 49 is formed and the first connecting means 39 on the first cover 9 have a cylindrical guide member 50 for the latching member 46, which extends through the central opening 49 of the latching member with a free end 51. An axial bore 52 is formed in the free end.

In order to release the four connecting devices 29, the drive unit 2 has been provided with a release device. Said device comprises four release elements 53 which are movable relative to the disc unit 2. Said element are stationarily mounted on the deck plate 20. As is to be described in more detail, the displacement device of the drive unit 2 moves the disc unit 1 relative to the stationary release elements 53. The release elements serve to pivot the pivotable fingers 41, from the outside of the enclosure, from the connecting position (shown in FIG. 5) to the released position (shown in FIGS. 19 through 21), the openings 44 in the annular stops 40 allowing both the release elements 53 and the pivotable fingers 41 to pass through when the covers 9 and 10 are moved to their operating position.

In order to release the connecting devices 29, the release elements 53 of the drive unit cooperate with the latching member 46 of the connecting devices, namely by means of unlatching members 54, which move the latching members from the latched position to the unlatched position. Each unlatching member comprises an annular portion at the top of a release element 53. The release elements 53 are also formed with locating pins 55 which fit into the axial bores 52 of the connecting devices 29, for locating the disc unit on the drive unit.

The first connecting means 39 comprise a component made of an elastic plastic and mounted on the first cover 9. It comprises, as an integral unit, the pivotale fingers 41 as well as the guide member 50 and a disc-shaped portion 56. Said portion is mounted in the cover 9 in a suitable manner, for example by glueing. A suitable plastic is for example polyamide. The annular stop 40 of the second cover 10 is integral with the second cover.

Figures 7, 8:
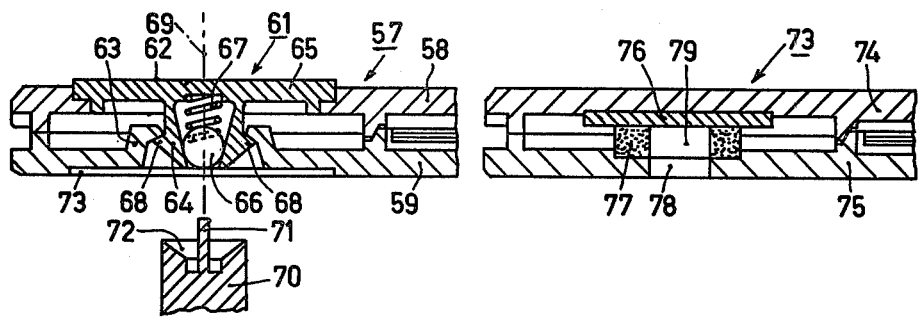
FIG. 7 is a partial cross-sectional view of a disc unit similar to that of FIG. 5, but provided with a different connecting device.
FIG. 8 is similar to FIG. 7, but shows a magnetic connecting device.

FIG. 7 shows that it is also possible to employ different connecting devices. A disc unit 57 comprises a first cover 58 and a second cover 59, which constitute an enclosure for an information disc 60. The connecting device 61 comprises first connecting means 62 connected to the first cover 58 and second connecting means 63 in the form of an annular stop which is integral with the second cover 59. Also in this case the first connecting means constitute an integral unit and comprise four fingers 64 which are connected to a disc 65, which is glued to the first cover 58. In this embodiment the latching member comprises a ball 66, which is loaded by a compression spring 67. Each of the fingers 64 has a hook-shaped portion 68, which in the closed position of the enclosure cooperates with the upper rim of the annular stop 63. The compression spring 67 may be proportioned so that the pressure exerted on the ball 66 is sufficient to move the fingers toward a connecting position. It is alternatively possible to provide the first connecting means 62 with fingers which are pre-loaded by their own elasticity. For moving the fingers to their released positions they should then be moved against their own elastic pre-load. The release element 70 of the associated release device is provided with an unlatching member cooperating with the latching member 66, which unlatching member takes the form of a pin 71. A conical recess 72 is located around said pin in the free end of the release element 70. This recess cooperates with the fingers 64 and pivots said fingers to their released positions.

The disc 65 of the connecting device 61 of FIG. 7 has an upper surface which slightly projects from the upper surface of the first cover 58. The lower cover 59 has a corresponding recess 73. Thus a number of disc units 57 may be stacked without sliding off each other.

Without departing from the principle of the invention the connecting devices shown in FIGS. 5 through 7 may be modified in different ways. Thus, it will be apparent that instead of four connecting elements it is also possible to provide a greater or smaller number of such elements. It is even possible to use a single connecting element. In that case, instead of a release element which moves axially with a central axis such as 69, a modified release element may be used which moves transversely to the axis and which cooperates with the free end of the sole connecting element. Such a transversely acting release element may also be modified so that it enters via an opening in the side wall of the disc-unit enclosure, so as to pivot the connecting element to its released position. Another embodiment which is conceivable does not only have an annular stop 63 but, disposed above it, has a second annular stop for the fingers 64, so that the covers 58 and 59 can only move relative to each other over the distance between said two stops. This distance would be sufficient to allow the information disc to rotate inside the enclosure. The disc unit, in such an embodiment, may not be adapted to cooperate with magnetic heads which are passed over the discs from the side.

FIG. 8 shows a connecting device for a disc unit 73 having an upper cover 74 and a lower cover 75. A metal disc 76 is secured to the inside of the first cover 74 and functions as first connecting element. On the second cover 75 there is provided the second connecting element in the form of an annular permanent magnet 77. An opening 78 in the first cover corresponds to an opening 79 in the annular permanent magnet for the passage of a release element. Said release element presses the first cover 74 away from the second cover 75 which is retained during this press-away operation.

Figure 9:
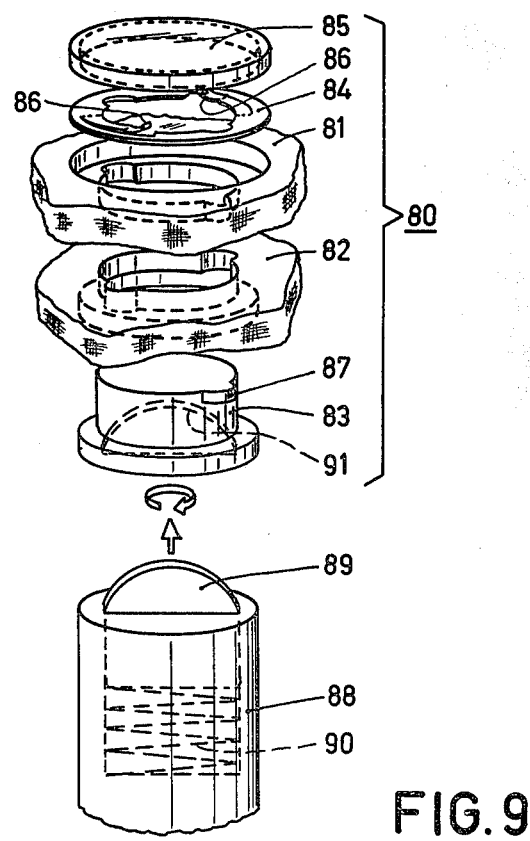
FIG. 9 is an exploded view of a bayonet connecting device for a disc unit as well as a part of a connecting-member rotator.

FIG. 9 shows a connecting device 80 for interconnecting two covers 81 and 82 which are shown in the operating position. The bayonet connecting device used comprises a rotatable connecting member 83 which is mounted for rotation in the second cover 82, as well as stationary connecting means on the first cover which cooperate with the rotatable connecting member 83. The stationary connecting means comprise a resilient ring 84 made of a resilient sheet material and a plastic cap 85. The resilient ring 84 has two resilient tabs 86, which serve to resiliently latch two lugs 87 on the connecting member. The cap 85 retains the resilient ring 84 in the first cover 81 and secured to said cover, for example, by glueing. Since bayonet connecting devices are well known, the operation of the connecting device for interconnecting the two covers 81 and 82 is not further described.

For releasing the connection the drive unit is provided with a release device having a rotable connecting-member rotator 88. At its top said rotator comprises a stop, which takes the form of a disc 89 which is loaded by means of a compression spring 90 disposed in the hollow connecting-member rotator 88. In its end face the rotatble connecting member 83 has a slot 91, with which the stop 89 engages. The connecting-member rotator 88 and the rotatable connecting member 83 cooperate with each other in a manner similar to that of a screwdriver and screw. If, at the instant that the connecting member rotator in a disc unit is engaged by the release device of the drive unit the stop 89 is not in the correct position relative to the slot 91, the stop 89 is depressed against the load of the compression spring 90 and, as it is rotated, it will ultimately snap into the slot 91.

Figure 10:
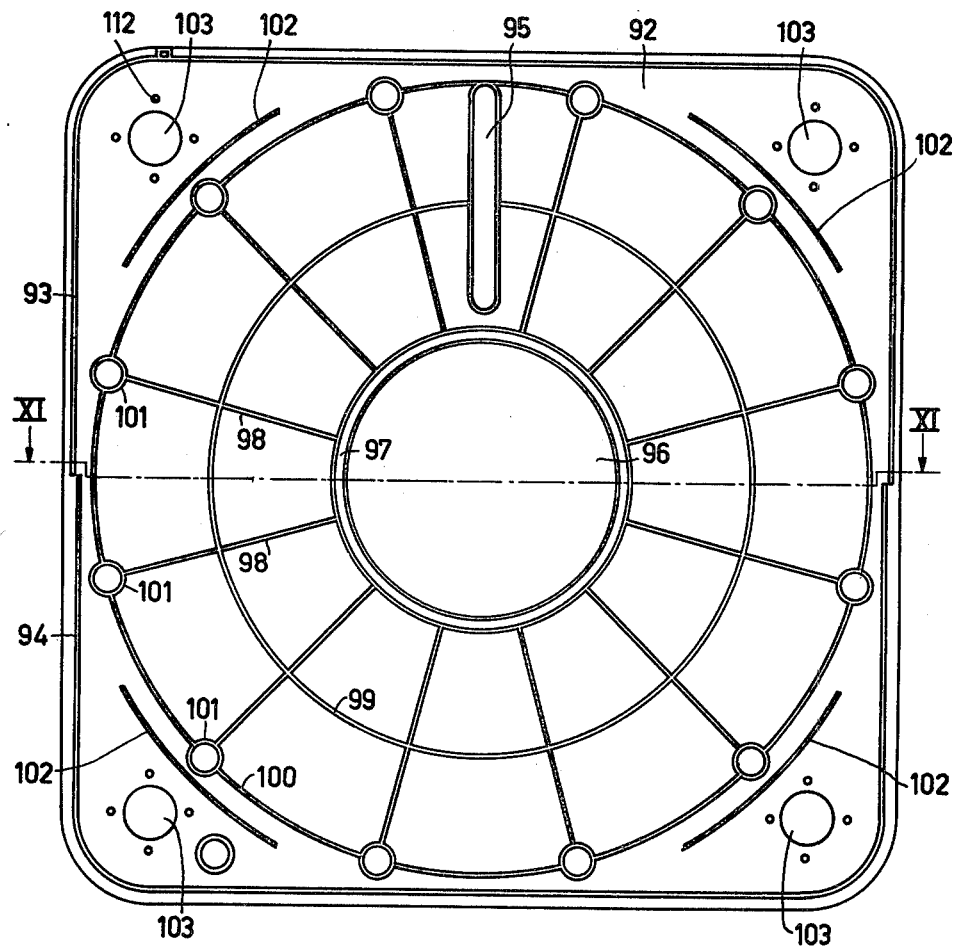
FIG. 10 is an interior view of an enclosure cover for an optical information disc.
Figure 11:
FIG. 11 is a cross-sectional view of the cover of FIG. 10 taken along the line XI—XI.

FIGS. 10 and 11 relate to a cover for a disc unit having an optical information disc. The optical information disc, not shown, has an outer diamter of approximately 30 cm, so that the disc unit is substantially larger than the previously discussed disc unit with a magnetic information disc. The cover 92 is substantially square. It has been constructed so that it may be used either as an uppercover or a lower cover. The part above the cross-section XI—XI has a slightly different shape than the part below it, the side walls 93 and 94 being slightly offset relative to each other. As a result of this a side wall 94 of another similar cover is movable along the side wall 93 and, conversely, a side wall 93 of the other cover along the side wall 94 of the cover shown. Said side walls are comparatively high, because of the optical disc need not be laterally accessable in the drive unit. The cover 92 is formed with a radial slot 95 through which an optical pick-up, which is radially movable on the deck of a drive unit, can be focused on the optical information disc. For dust-sealing purposes and also in order to protect the information disc against shocks, an annular slot 97 is formed around the central opening 96 of the cover, in which an elastic ring, such as a rubber O-ring can be seated. In order to reinforce the cover a number of upright radical reinforcement ridges 98 and two concentric circular reinforcement rings 99 and 100 have been provided. At the intersections of the ridges 98 and the ring 100 circular walls 101 are formed, in which studs of an elastic material such as rubber can be fitted. Four arc-shaped ridges 102 serve for radially retaining the optical disc. Near the four corners the cover 92 is formed with openings 103 for the connecting devices. These connecting devices, see FIGS. 12 and 13, comprise elastically deformable members for elastically urging he two covers toward each other in any position. The first and the second connecting means each comprise a substanially disc-shaped resilient element 104 with a center opening 105 and a number of slots 106 through 108 in the form of circular segments which are concentric with the center opening 105. Near the center opening 105 the disc has a hub-shaped portion 109 with a central opening 110. Nearer the circumference a number of openings 111 are formed. The cover 92 has openings 112 corresponding to the openings 111, so that the resilient elements 104 can be mounted onto the cover 92 through the holes 111 and 112 by means of screws (not shown). Facing discshapped spring elements 104 are interconnected by means such as a bolt (not shown) passing through the central openings 110. The height of the hub-shaped portion 109 is such that before the connection is made some clearance exists between the two hub-shaped portions, so that said portions have to be moved toward each other over some distance. This results in a certain pre-tension of the spring elements caused by the deflection of those portions which are situated between the slots 106 through 108 when the facing spring elements 104 are connected.

The drive unit 2, as well as the co-operation of the drive unit with the disc unit 1, will now be discussed in more detail.

Figure 14:
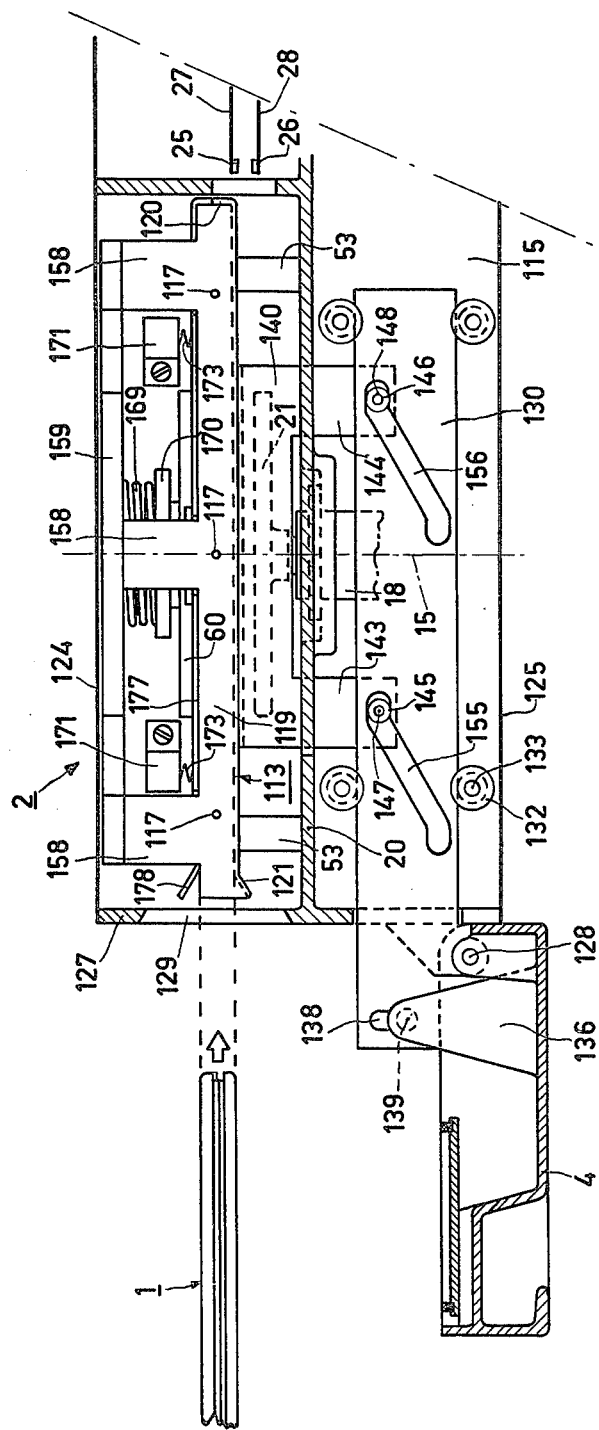
FIG. 14 is a cross-sectional view over a part of the drive unit of FIGS. 1 and 2, with opened flap.
Figure 15:
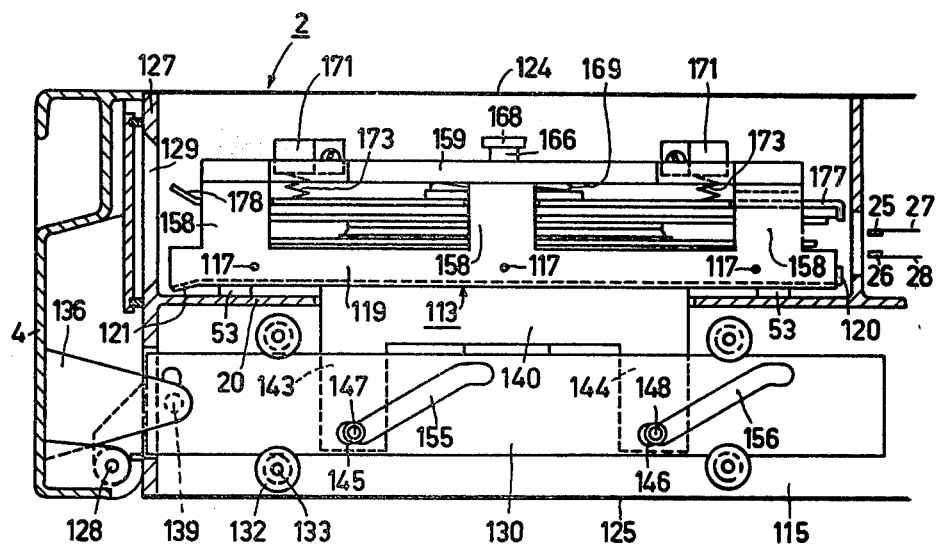
FIG. 15 is a similar cross-sectional view, but with the flap closed.
Figure 16:
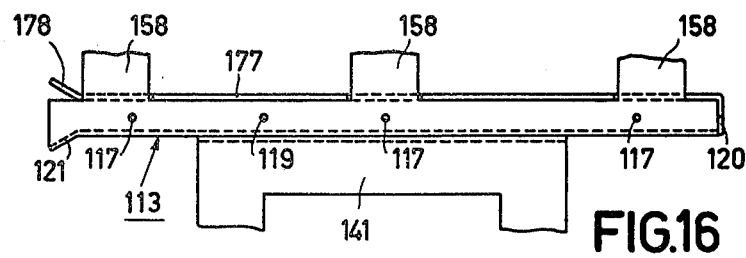
FIG. 16 is a side view of a part of the drive unit of FIGS. 14 and 15, as it appears when it accommodates the disc unit of FIGS. 3 and 4 in a rest position.
Figure 17:
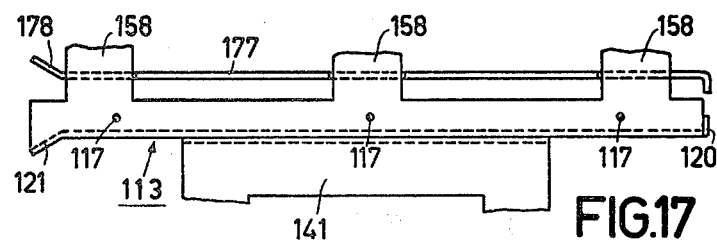
FIG. 17 shows the same part as FIG. 16, but shows it as it appears when it accommodates the disc unit in the operating position.
Figure 18:
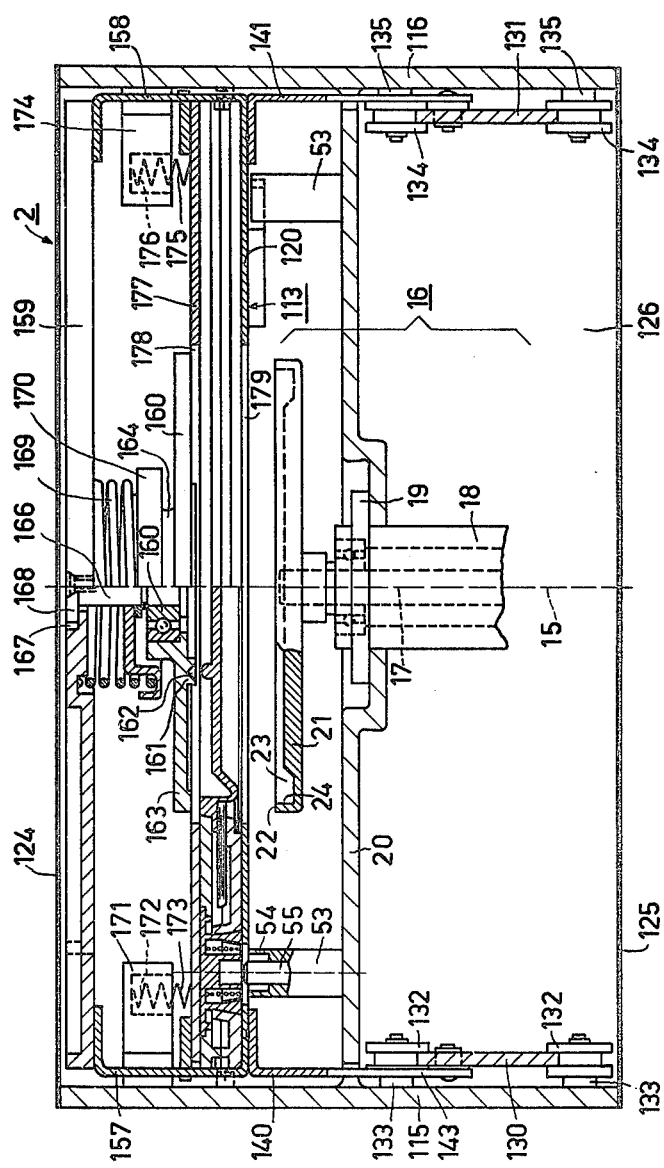
FIG. 18 is a cross-sectional view of the drive unit of FIGS. 1 and 2 and provided with a disc unit, such as that of FIGS. 3 and 4, which is still in the closed position.

The cover displacement means of the drive unit comprises a supporting frame 113, which is movable between a rest position, see FIG. 14, FIG. 16 and FIG. 18, and an operating position, see FIG. 15, FIG. 17 and FIG. 21. In the rest position the supporting frame 113 serves for supporting a closed disc unit 1 at some distance from the drive device 16. In this position a disc unit can be inserted into or removed from the drive unit through the open flap 4, without being impeeded by the drive device 16. The supporting frame is movable between its rest position and its operating position, in a direction substantially parallel to the axis of rotation 15 of the drive device 16. As the supporting frame is moved from its rest position to its operating position the connecting devices 29 of the disc unit are moved to the release device of the drive unit. As stated previously, the release device comprises four release elements 53 mounted on the deck plate 20. The connecting devices of the disc unit are moved to the release elements 53 and made to cooperate therewith, so that the connecting device is released in the manner previously described. In the situation of FIG. 19, in which the supporting frame 113 is in a position intermediate between the rest position and the operating position, the connecting devices 29 have already been released. As the supporting frame moves down, the locating pins 55 contact the bottoms 114 of the bores 52 in the cyclindrical guides 50 of the connecting devices 29. This prevents further downward movement of cover 9, which is then supported in its operating position by the release elements 53. Thus, the release elements 53 function as first stops, which cooperate with the first cover 9 of the disc unit, for retaining the first cover in the operating position. Alternatively, stops could be used which are rigidly connected to the side walls 115 and 116 of the drive unit. For retaining the second cover 10 in its operating position, as well as for moving the second cover to its operating position, there are provided second retaining means which are movable relative to the release elements 53. These second retaining means comprise a number of second stops 117 which cooperate with the second cover 10. In the present embodiment of the drive unit said stops are arranged on the supporting frame 113. They comprise a number of pins 117 in the upright sides 118 and 119 of the supporting frame 113. The supporting frame 113 furthermore comprises a rear wall 120, which comes into contact with the enclosure when the disc unit has been inserted completetly and thus prevents the disc unit from being inserted too far. Betrween the side walls 118 and 119 the supporting frame has a flat bottom plate 120 with an oblique portion 121 at its front to facilitate insertion of a disc unit.

The enclosure of the disc unit 1 has a slot 122 in each side wall. The pins 117 project into two of the slots 122 of the disc unit 1. When the supporting frame 113 moves to the operating position the second cover of the disc unit is moved downward by means of the pins 117.

The disc units should always be placed onto the drive units in a manner as shown in FIG. 2, i.e. with the first cover 9 facing away from the drive device 16. In order to prevent incorrect insertion of the disc unit into the drive unit, the disc unit cannot be inserted into the drive unit if the disc unit faces the drive device 16 with the first cover. The first cover 9 of the disc unit is provided with a plurality of projections 123 which extend into the slot 122 over slightly less than half its width. The pins 117 on the supporting frame prevent incorrect insertion of the disc unit by coming in contact with the stops 123, if an attempt is made to isnert the unit with the first cover facing the drive device.

The supporting frame is moved between its rest position and its operating position by means of a moving mechanism whose construction will be described in more detail hereinafter. The drive unit 2 has a substantially box-shaped housing with mutually parallel lower and upper walls 124 and 125, mutually parallel side walls 115 and 116, a rear wall 126 and a front wall which consists of the hinged flap 4 as well as a partly open plate 127. With the aid of hinge pins 128 the flap 4 is movable between an open and a closed position about a pivoting axis transverse to the side walls 115 and 116. In the closed position the flap covers an opening 129 in the plate 127. In the opening position a disc unit can be slid onto the supporting frame 113 through the opening 129. Along the left-hand and right-hand side walls of the housing sliding members 130 and 131, which belong to the moving mechanism, are slidable between a frontmost position situated nearer the front of the housing (see FIG. 14), and a rearmost position situated nearer the back of the housing (see FIG. 15). The sliding members take the form of substantially rectangular sliding plates. The sliding plate 113 is guided along the side wall 115 with the aid of four guide rollers 132 which are mounted for rotation on the side wall 115 with the aid of pins 133. The sliding plate 131 is guided on the side wall 116 in a similar manner by means of rollers 134 on pins 135. This provides means for moving the sliding plates 130 and 131 with comparatively small force. The sliding plates are movably coupled to the flap 4 which has a left-hand lug 136 and a right-hand lug 137. A slot 138 is formed in the sliding plate 130. A pin 139 which is rigidly connected to the lug 136, engages with the slot. The sliding plate 131 is connected to the flap 4 in a similar manner, but this is not illustrated in the drawing. With the aid of said means the pivotable movements of the flap 4 are transformed into sliding movements of the sliding plates 130 and 131. This causes the sliding plates to be in the rearmost positions when the flap 4 is in its closed position and causes the sliding plates to be in their frontmost positions when the flap is in its fully open position.

The moving mechanism further comprises a translation device which is coupled to the supporting frame 113. The translation device comprises left-hand and right-hand translation members 140 and 141 which are each translatable between an upper position (see FIGS. 14 and 18) nearer the upper wall 124 of the housing and a lower position (see FIGS. 15 and 21) nearer the lower wall 125 of the housing. This device moves substantially parallel to the axis of rotation 15 of the drive device 16. The two translation members are made of sheet material. The translation member 140 comprises an upper flange 142, which is spot-welded to the bottom 120 of the supporting frame 113. Furthermore, there are provided limbs 143 and 144 which extend between the side wall 115 of the housing and the slide plate 130. Near its end each of the limbs comprises a roller 145 or 146, which is rotably journalled on a pin 147 or 148 respectively. The translation member 141 comprises an upper flange 149 and two limbs provided with rollers. FIGS. 18 through 21 only show a limb 150, provided with a roller 151 on a pin 152. The translation members are guided by slotted openings 153 and 154 in the deck plate 20. The sliding plate 130 has two guide slots 155 and 156, which for the most part extend obliquely and cooperate with the rollers 145 and 146 on the limbs 143 and 144 of the translation member 140. The sliding plate 131 has similar obliquely extending guide slots for cooperation with the translation member 141. Thus the flap 4, the sliding plates 130 and 131 and the translation members 140 and 141 are connected to the supporting frame 113 in such a way that my moving the flap from its open position to its closed position the sliding plates 130 and 131 are moved from their frontmost to their rearmost positions, the translation members are translated from the upper position nearer the upper wall 124 of the housing to the lower position nearer the lower wall 125 of the housing, and the supporting frame 113 is moved from the rest position to the operating position. The rollers on the translation members reduce friction in the moving mechanism, so that opening and closing the flap 4 demands little effort.

The supporting frame 113 has three upright supporting portions 147 on the left-hand side and similar supporting portions 158 on the right-hand side. Said portions are integral with the bottom 120 of the supporting frame and are thus moved simultaneously with said frame by the moving mechanism. At the top a supporting plate 159 has been screwed onto the supporting portions, on which plate a disc-shaped disc loader 160 is mounted. Said loader comprises an annular portion 161 with a groove 162, a portion 163 situated nearer the circumference, as well as a hub portion 164 in which a ball bearing 165 is mounted. Said ball-bearing is mounted on a pin 166, which extends with clearance through an opening 167 of the supporting plate 159 and at its top carries a plate 168, which prevents the pin from dropping out of the supporting plate. Around the pin 166 a helically wound compression spring 169 is arranged, which at its one end presses against the supporting plate 159 and at its other end against a spring cup 170, which is mounted on the pin 166.

Two blocks 171 are arranged on the side wall 115 of the housing, each formed with a recess 172 in which a compression spring 173 is mounted. The side wall 116 is equipped with blocks 174 and compression springs 175 mounted in receses 176. The compression springs 173 and 175 bear on a top plate 177 which, when the supporting frame 113 is in the rest position (see for example FIG. 16), is supported by the supporting frame. The front of plate 177 has an oblique side 178 which together with the supporting frame 113, constitutes an envelope for accommodating a disc unit in the rest position. A central opening 178 is formed in the top plate 177. This corresponds to a central opening 179 of the same size in the bottom 120 of the supporting frame 113.

After a disc unit 1 has been inserted into the envelope, comprising the supporting frame 113 and the top plate 177, the flap 4 is manually closed. By means of the moving mechanism already described, the supporting frame 113 is then moved from its rest position to its operating position. During this movement the top plate 177, which is constantly urged towards the supporting frame 113 by the compression springs 173 and 175, is initially moved downward together with the supporting frame. The same applies to the supporting plate 159, which is always coupled directly to the supporting frame 113 by means of the supports 157 and 158. FIGS. 18 through 21 illustrate the various states of the movement of the supporting frame from its rest position, FIG. 18, to its operating position, FIG. 21. FIG. 19 represents a situation in which the locating pins 55 bear against the bottom 114 of the first connecting means 39. The upper cover 9 of the disc unit and thus the top plate 177 which is supported thereby then can no longer move further downward. In the meantime the latching member 46 of the connecting devices 29 has been moved to its unlatched position, so that the lower cover 10 together with the supporting frame 113 can be further lowered by means of the pins 117. However, from the instant that the upper cover 9 no longer moves along with the supporting frame 113 a relative movement is obtained between the supporting plate 159 and the upper cover 9. As a result of this, the disc loader 160 will be moved through the central opening 178 of the top plate 177 upon a further downward movement. The information disc 6 initially also moves downward together with the lower cover 10 until the supporting surface 22 of the turntable 21 of the drive device 16 contacts the underside of the information disc. This situation is obtained in FIG. 20, the disc loader 160 having been lowered further and having passed through the central opening 11 of the upper cover. The centering element 7 of the information disc now engages with its convolution 14 in the recess 23 of the turntable 21 and cooperates with the inner wall 24 of the recess. The elastic member 183 on the cover 10 is deformed as illustrated. At its top the centring element 7 is provided with an upright annular stop 180, which engages with the annular slot 162 of the portion 161 of the disc loader 160. Once the situation of FIG. 20 is reached, the information disc can no longer move further downward, so that as the supporting frame 113 moves further, only the lower cover 10 is further lowered, until ultimately the operating position shown in FIG. 21 is reached. This further movement, from the position of FIG. 20, results in a movement of the supporting plate 159 relative to the information disc 6. Consequently, the annular portion 161 of the disc loader 160 comes into contact with the annular stop 180 of the centring element 7. As the supporting frame 113 is further lowered, the compression spring 169 is further compressed because of this contact, so that a relative movement is obtained between the disc loader 160 and the supporting plate 159. Because of the pressure of the compression spring 169, the central portion of the centering element 7 is depressed over a small distance, resulting in an elastic deformation, so that the convolution 14 is firmly pressed against the inner wall 24 of the central recess 23 in the turntable 21. As a result of this the information disc 6 is centered and clamped relative to the turntable and thus relative to the axis of rotation 15. For a more extensive description o this method of centering and clamping an information disc, reference is made to the Applicant's previously mentioned Netherlands patent application No. 79 08 859 (PHN 9648) corresponding to U.S. Pat. No. 4,358,803. As a result of the depression of the central portion of the centering element 7, the portion 163 of the disc loader 160 which is situated nearer the circumference also comes into contact with the information disc, namely with the annular portion 12 of the centring element 7, so that with the aid of the compression spring 169 the information disc is clamped between the supporting surface 22 of the turntable 21 and the outer portion 163 of the disc loader 60. Further lowering of the supporting frame 113 into its operating position causes the compression spring 169 to be further compressed until the supporting plate 159 has also reached its ultimate position, see FIG. 21. In this situation the information disc 6 is centered on the turntable 21 and can now be rotated by the motor 18. The magnetic heads 25 and 26 can be inserted between the covers 9 and 10, with the aid of positioning means provided for this purpose, in order to cooperate with both sides of the information disc 6.

When the flap is opened the aforementioned operations are performed in the reverse order, after which the disc unit, which is now closed again, can be removed from the drive unit by hand. Obviously, the magnetic heads should not be located between the two covers when the flap 4 is opened. Therefore it would be effective to have the flap 4 cooperate with a switch, which can control an electric circuit in such a way that a signal is supplied as soon as the cover 4 is opened, so that by means of a suitable control device it is possible to ensure that the positioning means return the heads 25 and 26 to the position of FIGS. 14 and 15 before the cover is further opened.

Both the actuation of the moving mechanism via the flap 4 and opening and closure of the connecting devices 29 demands little effort, so that it is readily possible to actuate the moving mechanism by hand via the flap.

Figure 12:
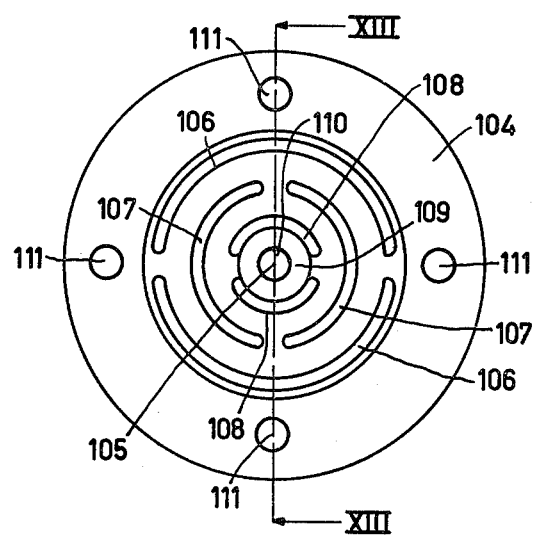
FIG. 12, is an elevation on an enlarged scale of a spring element for use in a disc unit with covers in accordance with FIGS. 10 and 11.
Figure 13:
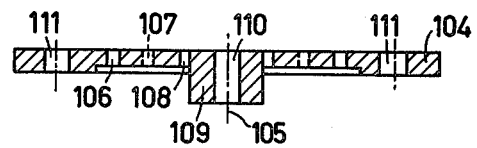
FIG. 13 is a cross-sectional view of the spring element of FIG. 12 taken along the line XIII—XIII.

A system which comprises disc units with covers 92 in accordance with FIGS. 10 and 11, interconnected by means of spring elements 104 in accordance with FIGS. 12 and 13, may include drive units which are slightly modified from the drive unit 2 shown. As first stops for limiting the translation of the upper cover, stops may be used which are rigidly mounted on the side walls of the housing. The second stops for retaining and moving along the other cover may have the same shape as the pins 117 in the drive unit 2. Driving, supporting, centering and loading the information disc may be effected in the same way as in the drive unit 2. Obviously, the covers need not be moved further apart than is necessary for a free rotation of the information disc. It should be avoided that the resilient elements 104 are overloded. Because the disc units are formed with slots 95 for an optical pick-up on the drive unit, care sould be taken that the disc units are placed in the drive unit in the correct position. The disc units and the drive units may be provided with corresponding parts which prevent the incorrect insertion of a disc unit.

The invention is not limited to the embodiments described but covers all embodiments which are within the scope defined by the claims.

What is claimed is:

1. An interchangeable disc unit comprising:
    A. a disc for holding recorded information, said disc including a central portion for engaging with a means for rotating the disc;
    B. an enclosure for the disc including a first cover and a second cover, which engage with each other and are movable relative to each other and relative to the disc from a closed position to an operating position, at least one of the covers having a central opening for enabling passage of the means for rotating the disc about an axis of rotation, independently of the first and second covers, when the covers have been moved from the closed position to the operating position, said enclosure, when viewed in a direction perpendicular to the plane of the information disc, having a substantially polygonal shape; and
    C. externally releasable connecting means for interconnecting the two covers, said connecting means comprising a plurality of separate connecting devices which are each disposed near a respective corner of the enclosure between that corner and the circumference of the disc, each connecting device including a first connecting means attached to the first cover and a cooperating second connecting means attached to the second cover.

2. A disc unit as in claim 1 where each first connecting means comprises a plurality of pivotable connecting elements which are uniformly arranged around a central axis, parallel to the axis of rotation of the disc, said elements comprising a plurality of fingers which extend away from the first cover; and each second connecting means comprises an annular stop for the fingers, which stop is coaxial with said central axis and has a central opening defined by an inner wall with a diameter which decreases in the direction of the first cover; said fingers engaging with said inner wall under the influence of resilient loading directed away from said central axis, when the first and second covers are interconnected.

3. A disc unit as in claim 2 where each first connecting means further comprises a latching member disposed between said fingers, said latching member being axially movable between a latched position in which it cooperates with the fingers to latch them in their connecting positions, and an unlatched position in which it allows the fingers to pivot to released positions.

4. A disc unit as in claim 3 where resilient means are provided for loading each latching member towards its latched position, thereby also resiliently loading the fingers toward their connecting positions.

5. A disc unit as in claim 4 where:
    A. each resilient means comprises a helically wound compression spring; and
    B. each latching member is cup-shaped with a bottom having a smaller diameter than an upper rim;
    said compression spring being confined within said latching member and pressing on the bottom of the member.

6. A disc unit as in claim 5 where the bottom of each cup-shaped latching member has a central opening, and the respective connecting device is provided with a guide member which is connected to the first cover and has a free end extending through the central opening of the latching member.

7. A disc unit as in claim 6 where the guide member has an axial bore which opens out of the free end thereof, and functions to guide release means utilized to release the latching means.

8. A disc unit as in claim 2 where each first connecting means comprises an elastic component secured to the first cover which integrally includes the pivotable connecting elements and where said stop on the second cover is integral with the second cover.

9. A disc unit as in claim 1 where the connecting devices comprise elastically-deformable first and second connecting means for elastically urging the two covers toward each other.

10. A disc unit as in claim 1 where the two covers are each made of a resilient material and have a curved shape, with one convex side and one concave side, the covers facing each other with their convex sides and being urged against each other by the connecting devices under the influence of a resilient pre-load, so that the disc is resiliently clamped in position between the two covers.

11. A disc unit as in claim 1 where the two covers are provided with respective dust-sealing means which, in the closed position of the covers, cooperate with each other and constitute a dust-sealing device which is situated concentrically around the circumference of the disc pack, said connecting devices for interconnecting the covers each being situated between a corner of the enclosure and the dust-sealing device.

* * * * *